United States Patent [19]

Aoki et al.

[11] Patent Number: 4,815,302
[45] Date of Patent: Mar. 28, 1989

[54] AUTOMATIC VENDING MACHINE

[75] Inventors: Kazumi Aoki, Gunma; Yukio Kikuchi; Tsuyoshi Fukui, both of Isesaki, all of Japan

[73] Assignee: Sanden Corporation, Gunma, Japan

[21] Appl. No.: 182,737

[22] Filed: Apr. 18, 1988

[30] Foreign Application Priority Data

Apr. 16, 1987 [JP] Japan .................. 62-57894[U]
Apr. 16, 1987 [JP] Japan .................. 62-57895[U]
Apr. 16, 1987 [JP] Japan .................. 62-57896[U]
Apr. 16, 1987 [JP] Japan .................. 62-57897[U]
Aug. 19, 1987 [JP] Japan .................. 62-125169[U]

[51] Int. Cl.4 ............................................. F25D 25/00
[52] U.S. Cl. ................................. 62/378; 221/150 R; 221/150 HC; 62/250
[58] Field of Search ............... 62/377, 378, 408, 250; 221/82, 150 R, 150 HC

[56] References Cited

U.S. PATENT DOCUMENTS

4,663,943 5/1987 Dyment et al. .................. 62/378 X
4,676,074 6/1987 Morgan, Jr. et al. ............ 62/378 X Primary Examiner—Lloyd L. King
Attorney, Agent, or Firm—Banner, Birch, McKie & Beckett

[57] ABSTRACT

The refrigerated or heated air flow within the storage chamber of a vending machine is varied by an air flow control device. A baffle plate or cover plate, or combination thereof, is used to control the direction of air flow. The position of these plates in turn is controlled by spring elements. One of the spring elements is formed of shaped memory alloy so that its recoil strength changes in accordance with its surrounding temperature. Thus, the difference in recoil strength between these spring elements changes with temperature. That difference is used to position the baffle and-/or cover plates to control air circulation.

16 Claims, 9 Drawing Sheets

AUTOMATIC VENDING MACHINE

BACKGROUND OF THE INVENTION

This invention relates to a vending machine, and more particularly, to a temperature control mechanism for a vending machine.

Various types of automatic vending machines are known for dispensing different types of merchandise. Some types of merchandise, such as a can or bottle containing a beverage, are stored in the vending machine in refrigerated or heated conditions to promote the sales of the merchandise. Therefore, certain vending machines should be provided with refrigerating and heating mechanisms.

Figure 1:
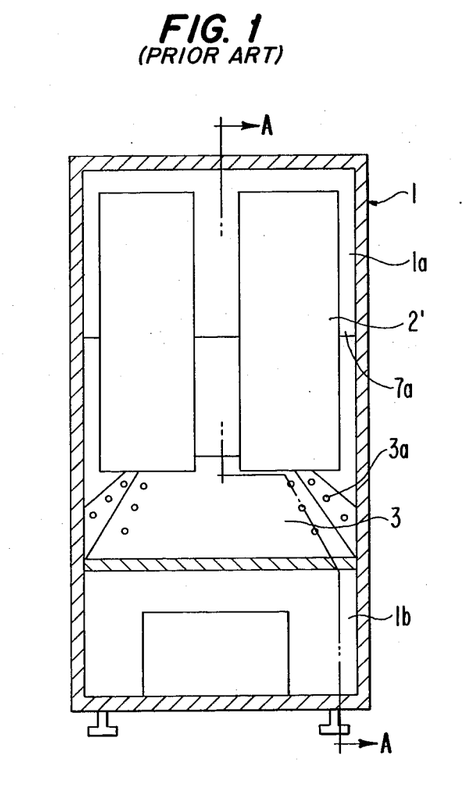
FIG. 1 is a diagramatic sectional view of a vending machine with a conventional refrigerating and heating mechanism.
Figure 2:
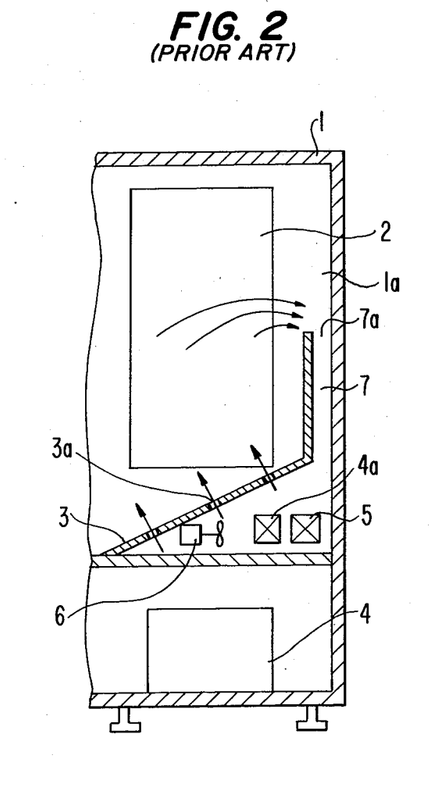
FIG. 2 is a sectional view taken along line A—A in FIG. 1.

With reference to FIGS. 1 and 2, a vending machine having conventional refrigerating and heating mechanisms will be explained. Interior space of the vending machine 1 is viertically divided into two chambers, such as storage chamber 1a and mechanical chamber 1b. Storage chamber 1a contains a plurality of dispensing columns 2 in which merchandise is stored and a shut plate 3 disposed below the bottom portion of dispensing columns 2 and slanted to guide the merchandise to a discharge opening (not shown). A plurality of holes 3a are formed through shut plate 3 to allow forced air circulation within the storage chamber 1a. Refrigerating apparatus 4 includes evaporator 4a and heating device 5 which are disposed underneath shut plate 3. Blower fan 6 circulates refrigerated and heated air. Because shut plate 3 is oriented at a slant, the space for disposing some parts of refrigerating apparatus 4 such as heating device 5 is provided. Other components of refrigerating apparatus 4 are dispsed within mechanical chamber 1b.

The refrigerated or heated air is returned to the space underneath shut plate 3 through duct 7 after heat exchange with the stored merchandise. Duct 7 is formed on the rear side of storage chamber 1a, as clearly shown in FIG. 2. Upper opening 7a of duct 7 is positioned at about the vertical midpoint of column 2. Therefore, merchandise stored in the lower half portion of each column 2 is refrigerated or heated.

One of the drawbacks of such vending machines is the potential for merchandise to be dispensed at an undesirable temperature. This may occur when the dispensing rate increases due to increased demand. One solution to this disadvantage is to fully refrigerate each column. This may be accomplished by positioning upper opening 7a of duct 7 at the upper end portion of column 2. However, if the dispensing rate decreases due to a decreased demand, merchandise stored on the upper half space of column 2 may be over-cooled or overheated which may adversely effect its flavor or quality.

SUMMARY OF THE INVENTION

It is a primary object of this invention to provide an automatic vending machine in which merchandise is effectively refrigerated or heated with simple construction.

It is another object of this invention to provide an automatic vending machine which is provided with a refrigerating/heating mechanism responding to dispensing rates.

An automatic vending machine in accordance with this invention includes a storage chamber for a plurality of dispensing columns, a refrigerating/heating device disposed on the lower portion of the storage chamber and an air circulation path for refrigerating or heating merchandise stored in the columns. The air circulation path comprises an air circulation duct disposed at the rear side of the storage chamber to provide communication between a space in which the refrigerating/heating device is disposed and the storage chamber, and an air gap defined between the opposed columns. An upper opening of the air circulation duct is positioned at the upper terminal end of the columns. An air circulation control device is disposed in the air circulation path to control the air flow direction depending on the desired refrigeration or heating of the merchandise.

Further objects, features and other aspects of this invention will be understood from the following detailed description of the preferred embodiments of this invention with reference to the annexed drawings.

BRIEF DESCRIPTION OF THE DRAWINGS

FIG. 10b is a rear side view of the cover plate in FIG. 10a.

DETAILED DESCRIPTION OF THE PREFERRED EMBODIMENTS

Figure 3:
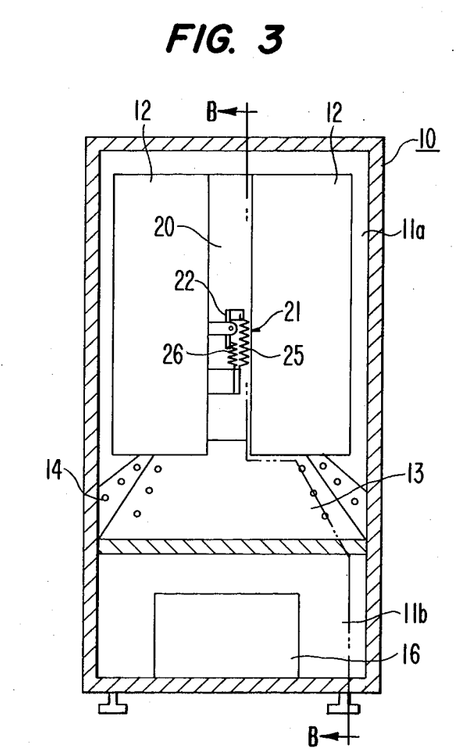
FIG. 3 is a diagramatic sectional view of a vending machine with refrigerating and heating mechanisms in accordance with one embodiment of this invention.
Figure 4:
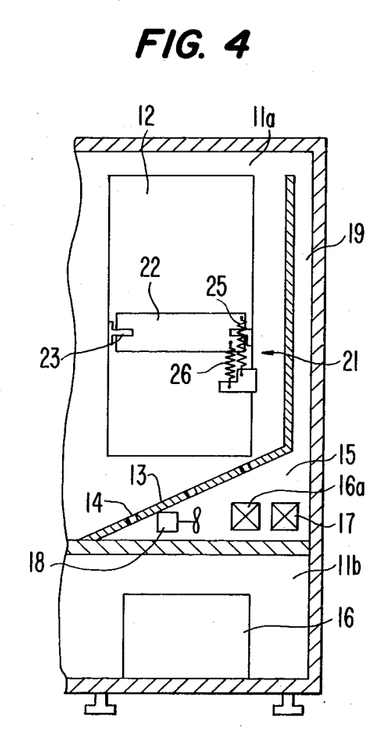
FIG. 4 is a sectional view taken along line B—B in FIG. 3.

Referring to FIGS. 3 and 4, an automatic vending machine with a temperature control mechanism in accordance with one embodiment of this invention is shown. Automatic vending machine 10 defines interior space 11. The interior space 11 is divided into two chambers, storage chamber 11a and mechanical chamber 11b.

A plurality of columns 12 for storing the merchandise are vertically disposed in storage chamber 11a. A shut plate 13 is disposed at the lower portion of columns 12 and is slanted to guide the merchandise to a discharge opening (not shown) of vending machine 10. The shut plate 13 is formed with a plurality of holes 14 to allow air circulation. Since shut plate 13 is disposed at a slant, space 15 is formed behind shut plate 13 to allow positioning of some parts of refrigerating means 16, such as evaporator 16a and heating device 17. The refrigerated or heated air is forced into storage chamber 11a by blower fan 18. Furthermore, other components of refrigerating means 16, such as a compressor, condenser and blower fan for cooling the condenser, are disposed within mechanical chamber 11b.

An air duct 19 is formed at a rear portion of storage chamber 11a to provide air communication between an upper portion of storage chamber 11a and space 15 behind the shut plate 13. Therefore, the refrigerated or heated air flows into storage chamber 11a from space 15 due to operation of blower fan 18, and returned to space 15 through air duct 19 after heat exchange with the merchandise which is stored in columns 12. The refrigerated or heated air in storage chamber 11a goes up along vertical air gap 20 formed between columns 12.

An air circulation control device 21 is disposed at about the vertical midpoint of air gap 20 to control the direction of air flow. The air circulation control device 21 comprises a rectangular-shaped baffle plate 22, supporting shaft 23 extending from one side of baffle plate 22, to rotatably support a baffle plate 22 on column 12 through bracket 24, and at least two spring elements 25 and 26. Spring elements 25 and 26 are parallel. One end of each spring element 25 and 26 is attached to a portion of baffle plate 22 adjacent one end thereof. The other end of each spring element 25 and 26 is attached on bracket 27 fixed on the column 12.

When spring element 26 is pulled, one side of baffle plate 22 is positioned vertically. Thus, spring 26 functions as a bias spring. The other spring element 25 is formed of shaped memory alloy. The transformation point of the shaped memory alloy, i.e., temperature to transform the element to memorized shape, is preferably determined while considering the temperature of the exterior space. Thus, the recoil strength of spring element 25 under normal or lower temperature conditions is lower than that of bias spring 26. Conversely, the recoil strength of spring element 25 when transformed to the memorized shape is higher than that of bias spring 26.

Therefore, the air flow passing through air gap 20 is controlled by operation of baffle plate 22 which in turn is controlled by the difference in recoil strength between spring elements 25 and 26. The operation of baffle plate 22 will be explained with reference to FIGS. 5a and 5b.

Figure 5A:
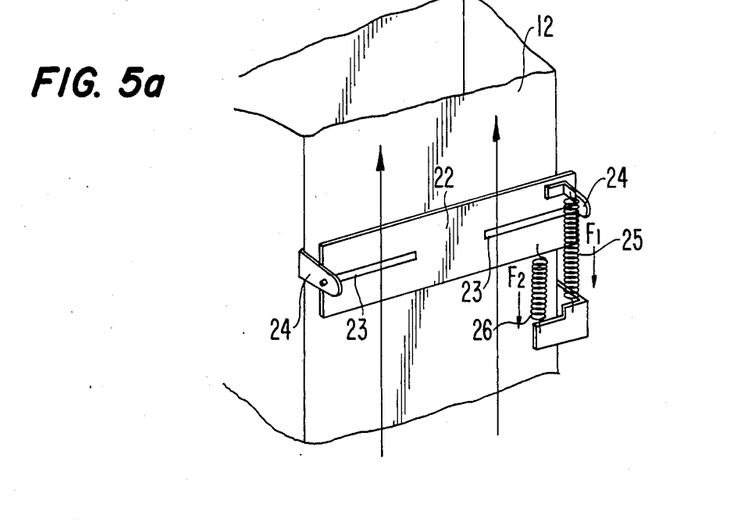
FIGS. 5a and 5b are diagramatical perspective views of an air circulation control device utilized in the vending machine of FIG. 3 and illustrated in its operation.

If the merchandise in the vending machine is stored under a refrigerated condition, drive spring 25 will be existing under a temperature lower than the transformation temperature, and the recoil strength (F2) of bias spring 26 will be greater than the recoil strength (F1) of drive spring 25 (that is F1<F2). Therefore, in this condition, baffle plate 22 is vertically positioned enabling flow of refrigerating air, as shown in FIG. 5a. All of the merchandise stored throughout a given column 12 is fully refrigerated.

Figure 5B:
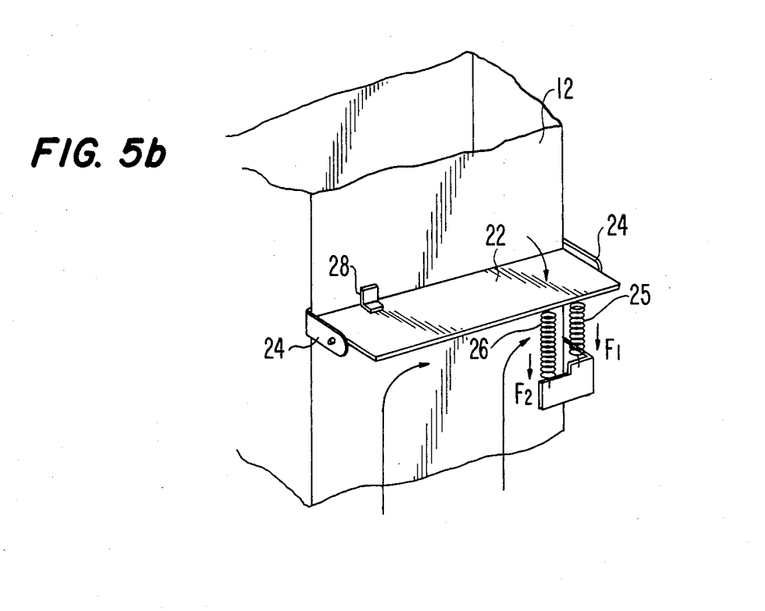

Conversely, if merchandise in the vending machine is stored under a heated condition, drive spring 25 will be existing under a temperature higher than the transformation temperature, and the recoil strength (F1) of drive spring 25 will be grreater than the recoil strength (F2) of bias spring 26 (that is F1>F2). Therefore, in this condition, baffle plate 22 baffles air gap 20 to impede hot air flow, as shown in FIG. 5b. At this time, restriction or stop element 28, fixed on column 12, ensures the horizontal posture of baffle plate 22 by preventing baffle plate 22 from excessive rotation. In this state, the merchandise stored in the lower half portion of column 12 is heated. The heated air after heat exchange with the merchandise is then drawn into air duct 19 to be returned to space 15.

Figure 6:
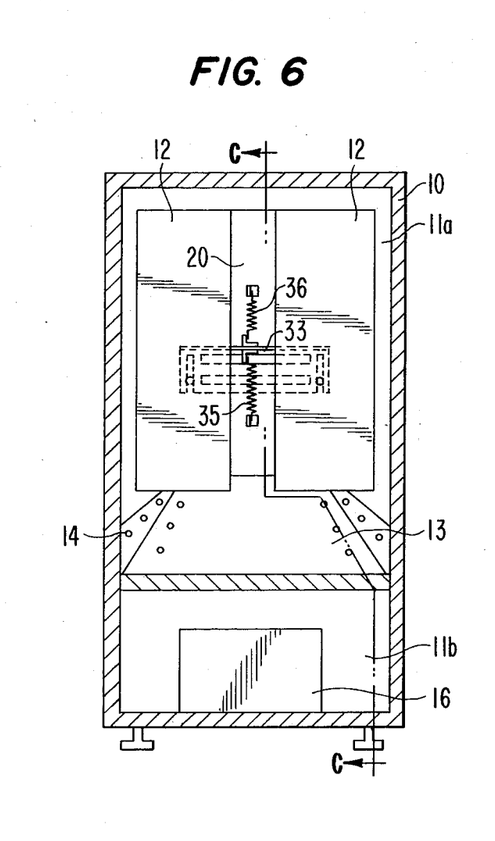
FIG. 6 is a diagramatic sectional view of a vending machine with a refrigerating and heating mechanism in accordance with another embodiment of this invention.
Figure 7:
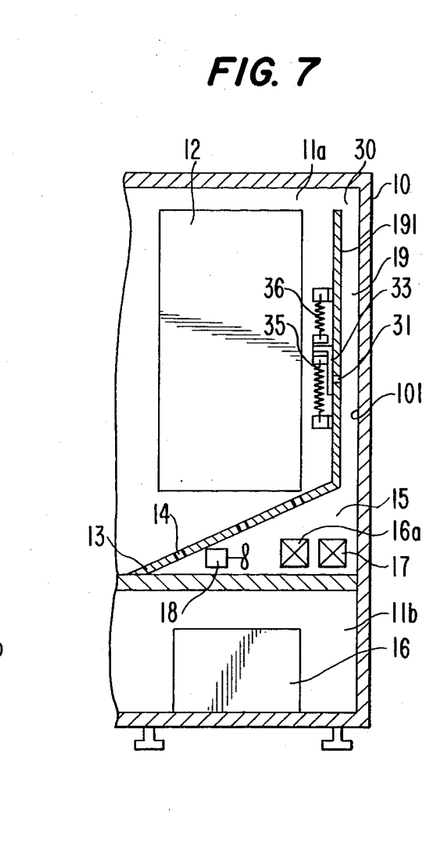
FIG. 7 is a sectional view taken along line C—C in FIG. 6.

FIGS. 6 and 7 illustrate another embodiment of this invention wherein parts of the machine which are similar to the parts of the machine shown in FIGS. 2 and 3 are indicated by the same number but the description of that construction is substantially omitted to simplify the description hereafter.

Air duct 19 is defined by rear end plate 101 of vending machine 10 and duct plate 191, and provided with first suction opening 30 placed at the upper portion of storage chamber 11a. A rectangular-shaped hole or slot 31 is formed through duct plate 191 and functions as second suction opening 31. This second suction opening 31 is opposed to the midway portion of column 12. A cover plate 33 is slidably attached on one side surface of duct plate 191 to slide over second suction opening or by-pass hole 31. Cover plate 33 is formed with a rectangular-shaped hole 331 for operative association with second suction opening 31 to form the air flow way while both hole and opening 331, 31 are aligned with one another. The sliding motion of cover plate 33 is guided by a guide mechanism, such as slits 332 formed at opposite ends of cover plate 33, and pin 34 which is fixed on duct plate 191 and extended into slit 332. This guide mechanism also functions to limit the position of the cover plate when the cover plate is pulled downwardly, so that alignment of hole 331 of cover plate 33 and second suction hole 31 results.

The sliding motion of cover plate 33 is controlled by a pair of spring elements 35 and 36. that is, cover plate 33 is hung on one spring element 36 which functions as a bias spring. The cover plate is pulled downwardly by spring element 35 which is formed of shaped memory alloy and functions as a drive spring. Therefore, the difference in recoil strength between spring elements 35 and 36 causes the sliding motion of cover plate 33 thereby controlling the opening and closing of second suction opening 31.

Figure 8A:
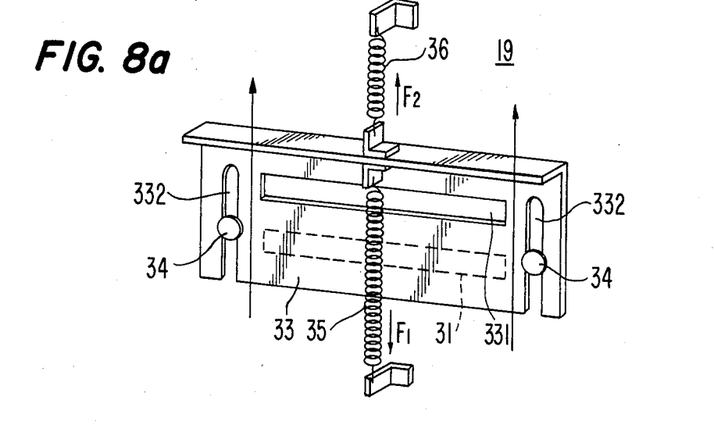
FIGS. 8a and 8b are diagramatic perspective views of an air circulation control device utilized in the vending machine of FIG. 6 and illustrated in its operation.

The recoil strength (F1) of drive spring 34 under normal temperature conditions is selected to be lower than the recoil strength (F2) of bias spring 35 (F1<F2). In this state, cover plate 33 is pulled upwardly by the recoil strength of bias spring 35. At that time, second suction opening 31 is fully covered by cover plate 33. Thus, refrigerated air is passed along the columns and returned to space 15 through first suction opening 30. (This situation is shown in FIG. 8a.)

Figure 8B:
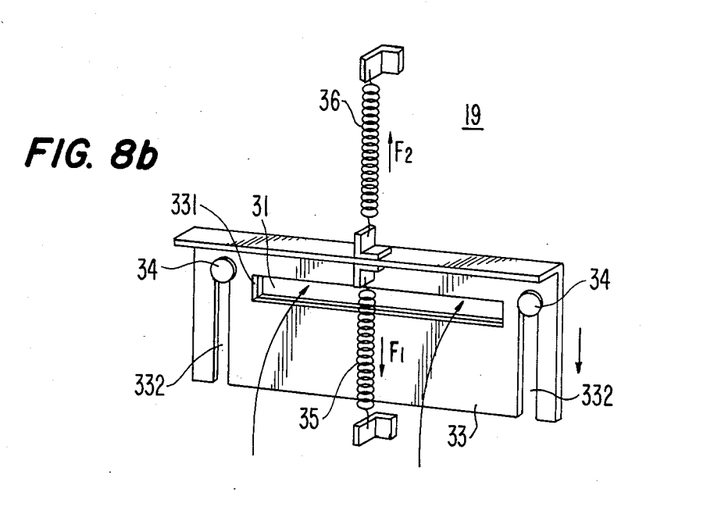

Conversely, when drive spring 35 is existing under a temperature higher than the transformation temperature, the recoil strength (F1) of drive spring 34 becomes greater than the recoil strength (F2) of bias spring 35 (F1>F2). In this state, cover plate 33 is pulled downwardly by the recoil strength of drive spring 34. At that time, hole 331 of cover plate 33 is aligned with second suction opening 31 to thereby draw the heated air into air duct 19. The merchandise stored in the lower portion of column 12 is concentrically heated by heated air. (This situation is shown in FIG. 8b.)

Figure 9:
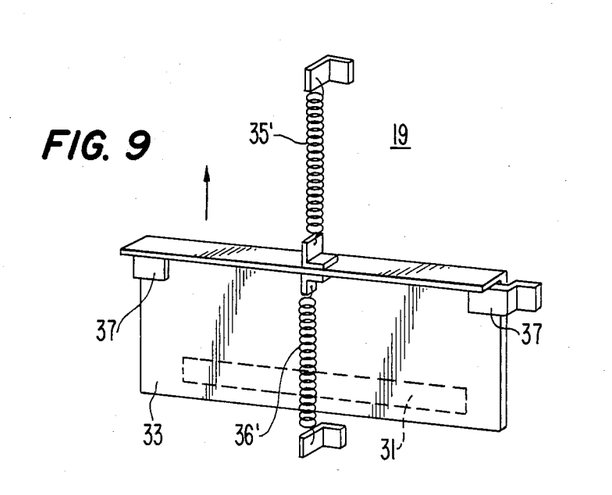
FIG. 9 is a perspective view of an air circulation control device with the cover plate moving device of FIG. 8 modified.

Referring to FIG. 9, if cover plate 33 is hung on drive spring 35' formed of shaped memory alloy to be pulled downwardly by bias spring 36', hole 331 on cover plate 33 can be omitted. The opening and closing of second suction opening 31 is controlled by cover plate 33. When cover plate 33 sufficiently moves, second suction opening 31 is open. In this structure, the sliding motion of cover plate 33 may be secured by L-shaped brackets 37 attached on duct plate 191.

Figure 10A:
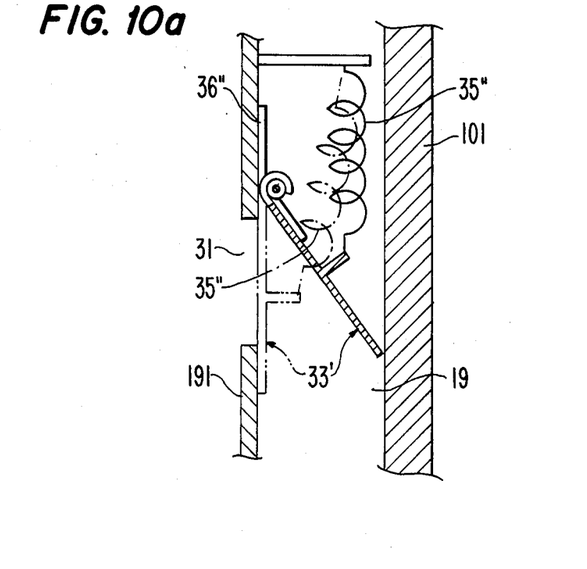
FIG. 10a is a partly sectional view of an air circulation control device in accordance with still another embodiment of this invention.
Figure 10B:
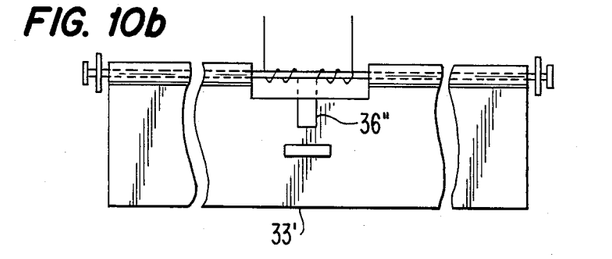

As shown in FIG. 10, the opening and closing of second suction opening 31 may be controlled by cover plate 33' hingedly secured to duct plate 191. Cover plate 33' is pushed against duct plate 191 to cover the opening of second suction opening 31 by bias spring 36" and pulled by drive spring 35" formed of shaped memory alloy to open the opening of second suction opening 31. Therefore, pivotal movement of cover plate 33' is controlled due to the difference in recoil strength between bias and drive springs 35" and 36".

Figure 11A:
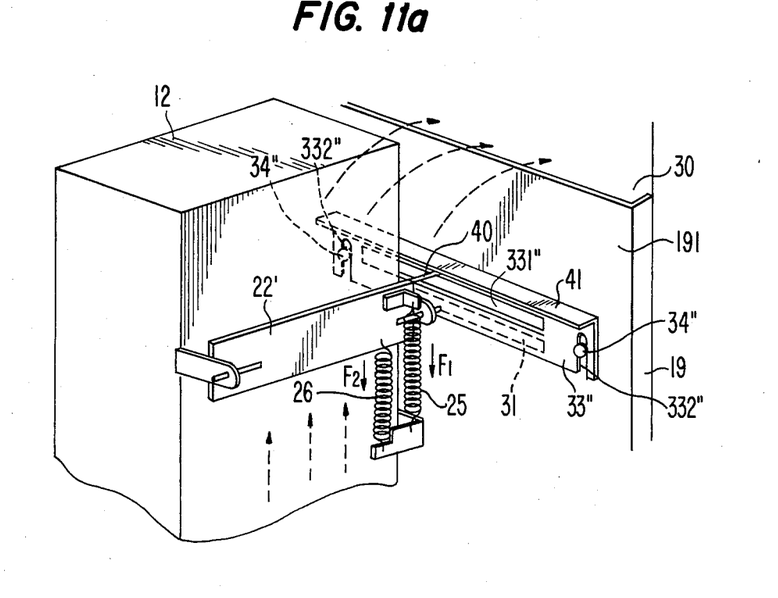
FIGS. 11a and 11b are diagramatic perspective views of an air circulation control device in accordance with a further embodiment of this invention and illustrated in its operation.
Figure 11B:
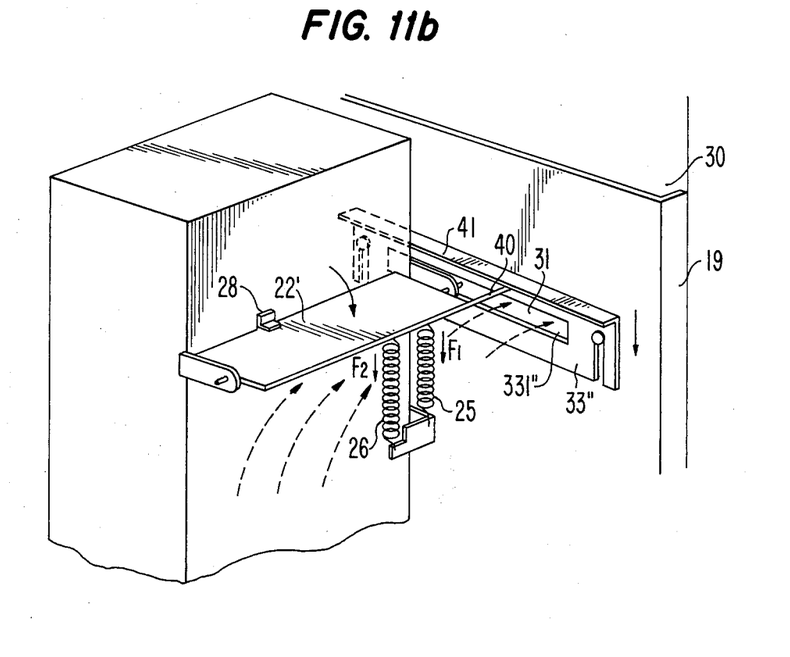

FIG. 11 illustrates a modification of the air circulation control device depicted in FIGS. 6 and 7. The operating device for cover plate 33 is modified. In FIGS. 6 and 7, the sliding motion of cover plate 33 is directly controlled by the difference in recoil strength between the drive and bias springs, but in this embodiment, cover plate 33' is controlled by the air circulation control device 21 shown in FIGS. 3 and 4.

A control lever 40 extends from the corner edge of baffle plate 22' toward duct plate 191. Control lever 40 is engaged with horizontal flange 41 formed on the upper edge of cover plate 33". Therefore, the sliding motion of cover plate 33" to control the opening and closing of second suction opening 31 is dependent on the rotating motion of baffle plate 22'. Also, the rotating motion of baffle plate 22' is controlled by the difference in recoil strength between the drive and bias springs, as explained with reference to FIGS. 5a and 5b. Therefore, if baffle plate 22' is vertically positioned parallel with air gap 20 to allow the refrigerated air flow, second suction opening 31 is closed by cover plate 33". (This situation is shown in FIG. 11a.) At that time, merchandise stored on column 12 is fully refrigerated by refrigerating air passing among the columns and along the air gap 20.

Figure 12:
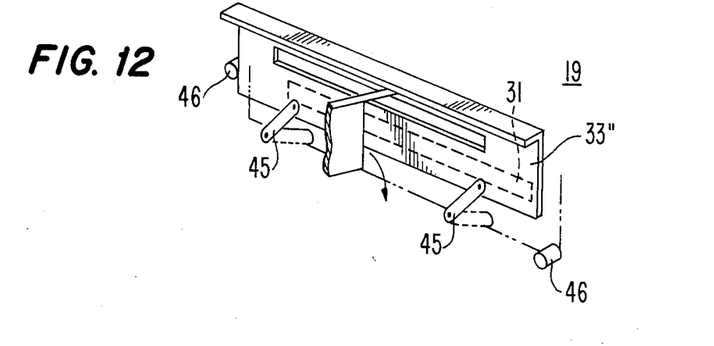
FIG. 12 is a perspective view of a modification of the cover plate of FIG. 11.

Conversely, when baffle plate 22' extends over the air gap 20 to interrupt the air flow, second suction opening 31 is opened to form the air by-pass. (This situation is shown in FIG. 11b.) At that time, merchandise stored in the lower half portion of column 12 is concentrically heated by heating air. It follows that the merchandise stored in the upper half portion of columns 12 may be held at ambient temperature. In this embodiment, the sliding motion of cover plate 33" is secured by pin 34 and slits 331". Alternatively, movement of cover plate 33" may be had by crank lever 45, as shown in FIG. 12. Under this embodiment, cover plate 33" has swing motion. The range in which cover plate 33" can move should be restricted by a pair of pin elements 46.

Figure 13A:
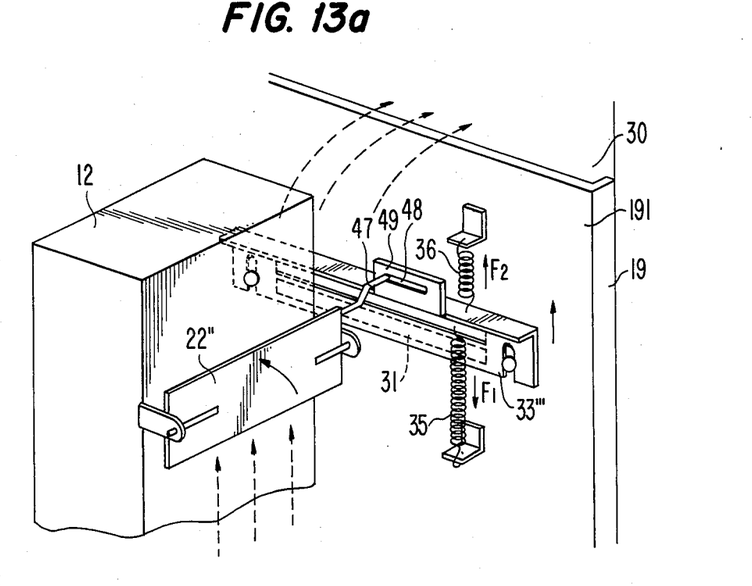
FIGS. 13a and 13b are diagramatic perspective views of an air circulation control device combining FIGS. 8 and 11 in accordance with a further embodiment of this invention, and illustrated in its operation.
Figure 13B:
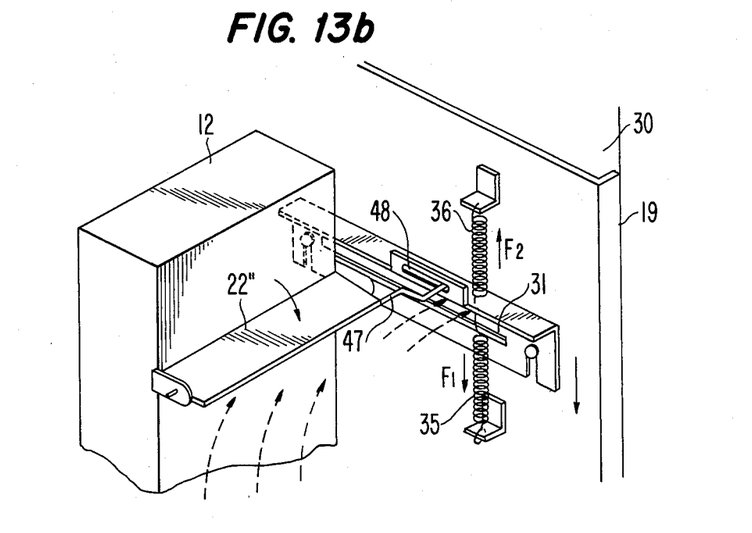

FIG. 13 illustrates further modification of the air circulation control device in FIGS. 3 and 4. That is, rotating operation of baffle plate 22" to control the air flow through air gap 20 is dependent on the sliding motion of cover plate 33'" which is controlled by the difference in recoil strength between bias and drive springs 35 and 36, as explained with reference to FIGS. 8a and 8b.

Figure 14:
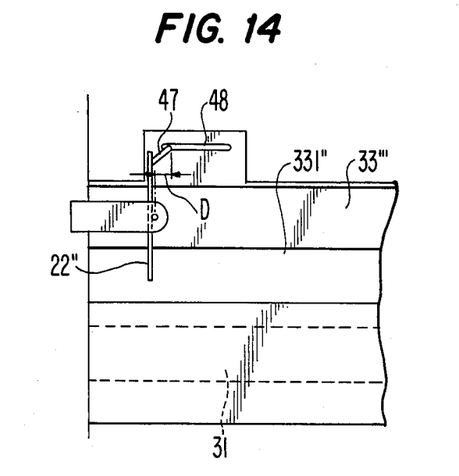
FIGS. 14 and 15 are modifications of the driving mechanism for the cover plate in FIG. 13.

A control lever 47 projects from one edge corner of baffle plate 22" toward duct plate 191 and extends into a rectangular-shaped hole 48 formed on radial flange 49 of cover plate 33'". If cover plate 33'" covers second suction hole 31, baffle plate 22" is positioned vertically. In this position, one terminal end of hole 48 which is closely positioned to baffle plate 22" should be offset from the vertical position of baffle plate 22" by distance D to provide smooth movement of baffle plate 22". This relationship is shown in FIG. 14. Therefore, the rotation of baffle plate 22" depends on the sliding motion of cover plate 33'". In FIG. 13a, merchandise stored in column 12 is fully refrigerated because baffle plate 22 does not interfere with air flow and second suction hole 31 is closed by cover plate 33'". On the other hand, in FIG. 13b, merchandise stored in the lower half portion of column 12 is concentrically heated because baffle plate 22" acts to redirect the heating air to space 15 through second suction opening 31.

Figure 15:
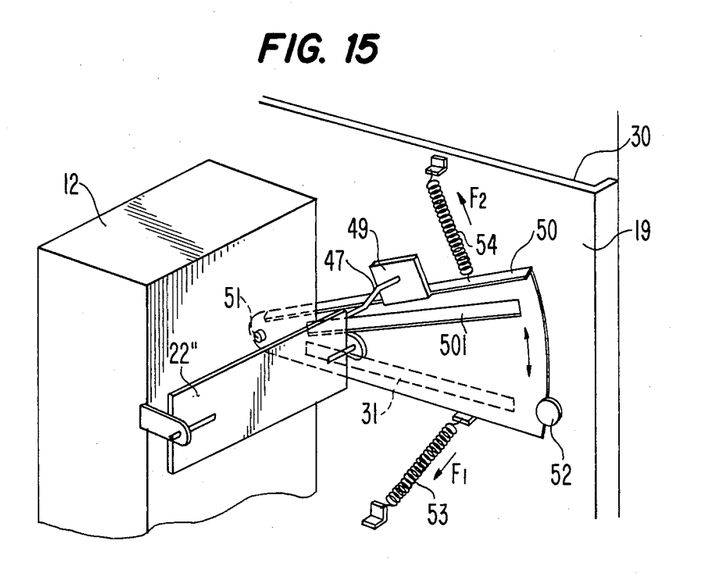

In this embodiment, cover plate 33'" slides vertically along the side surface of duct plate 191 due to change in recoil strength between bias and drive springs 35 and 36. Alternatively, referring to FIG. 15, cover plate 50 may be disposed on one side surface of duct plate 191 to enable it to rotate about center fixed pin 51. It also may be guided by guide plate 52. that is, cover plate 50 is arc-shaped and provided with a rectangular-shaped hole 501 to form the air by-pass. Spring elements 53 and 54 are attached to sideportions of cover plate 50 to provide pulling force. Therefore, cover plate 50 is rotated about fixed pin 51 in accordance with the change in recoil strength between spring elements 53 and 54 due to one of the spring elements being formed of shaped memory alloy.

Although preferred embodiments of the invention have been described in detail with respect to the accompanying drawings, it is to be understood that the invention is not limited to those precise embodiments, and that various changes and modifications may be effected therein by one skilled in the art without departing from the scope of the invention.

We claim:

1. In an automatic vending machine including a storage chamber having a plurality of parallel dispensing columns, and temperature control means for heating or refrigerating merchandise in the columns, the temperature control means including an air heating or refrigerating mechanism and an air circulation path which comprises a gap between two of said columns and an air return duct disposed between the plurality of columns and a wall of the storage chamber for returning spent air to the heating or refrigerating mechanism, the improvement comprising:

said air return duct extending along the full vertical length of the columns and having its uppermost portion aligned with the uppermost region of the columns; and an air circulation control means disposed along said circulation path for controlling the extent of air flow over the columns, said air circulation control means allowing only a part of each column to be treated by the heated or refrigerated air in a first control state and allowing the entirety of each column to be treated in a second control state.

2. The automatic vending machine of claim 1 wherein said air circulation control means is disposed at about the vertical midpoint of said gap, and comprises a baffle plate pivotally supported on one of said columns and a pair of spring elements each having one end secured to the baffle plate, wherein one of the spring elements comprises shaped memory alloy.

3. The automatic vending machine of claim 2 wherein said air circulation means further comprises a stop means for restricting rotation of said baffle plate, said stop means being secured to the one of said columns.

4. The automatic vending machine of claim 2 wherein said air circulation control means further comprises a by-pass hole formed in said air return duct and a cover plate slidably mounted over said hole for opening and closing said by-pass hole, wherein the baffle includes means for sliding the cover plate in response to baffle rotation.

5. The automatic vending machine of claim 4 wherein said cover plate has a rectangular-shaped hole for alignment with said by-pass hole.

6. The automatic vending machine of claim 4 wherein motion of said cover plate is guided by slits formed in said cover plate and guide pins extended from the duct and into said slits.

7. The automatic vending machine of claim 4 wherein crank levers are associated between the cover plate and the duct for guiding the cover plate sliding motion.

8. The automatic vending machine of claim 7 wherein pins extend from the duct to limit the motion of the cover plate.

9. The automatic vending machine of claim 1 wherein said air circulation control means is disposed at the vertical mid-portion of said duct, and comprises a suction hole formed at said mid-portion of said duct, a cover plate slidably mounted on said duct to control the opening and closing of said suction hole, and at least two spring elements each having one end secured to said cover plate and the other end secured to the duct to control the sliding motion of said cover plate, wherein one of the spring elements comprises shaped memory alloy.

10. The automatic vending machine of claim 9 wherein said cover plate is rectangular-shaped and is vertically slidable along said air return duct.

11. The automatic vending machine of claim 9 wherein said cover plate is formed as an arc-shaped member and is rotatably secured on said air return duct.

12. The automatic vending machine of claim 10 or 11 wherein said cover plate includes a hole for alignment with said suction hole.

13. The automatic vending machine of claim 10 wherein motion of said cover plate is guided by slits formed on both sides of said cover plate and guide pins extending from said duct and into said slits.

14. The automatic vending machine of claim 10 wherein crank levers are associated between the cover plate and the duct for guiding the cover plate with respect to the duct.

15. The automatic vending machine of claim 12 wherein said air flow control means further comprises a baffle plate pivotally supported on one of said columns, wherein the cover plate includes means for rotating the baffle plate in response to the sliding motion of said cover plate.

16. The automatic vending machine of claim 1 wherein said air circulation control means comprises a suction hole formed in said duct and a cover plate hingedly secured to said duct over the suction hole to control the opening and closing of said suction hole, two spring elements being secured to said cover plate, wherein one of said two spring elements comprises shaped memory alloy.

* * * * *